May 19, 1970
H. R. YOUNG
3,512,647
SWIMMING POOL FILTER COMPRISING ASSEMBLY OF SEPARABLE
SPACERS AND HAVING MOLDED PLASTIC GRIDS
Filed Aug. 24, 1967
2 Sheets-Sheet 1
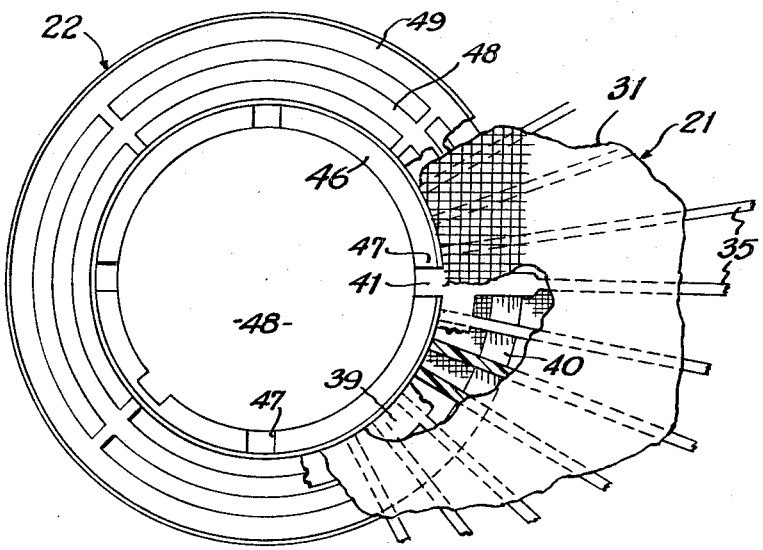
FIG. 3
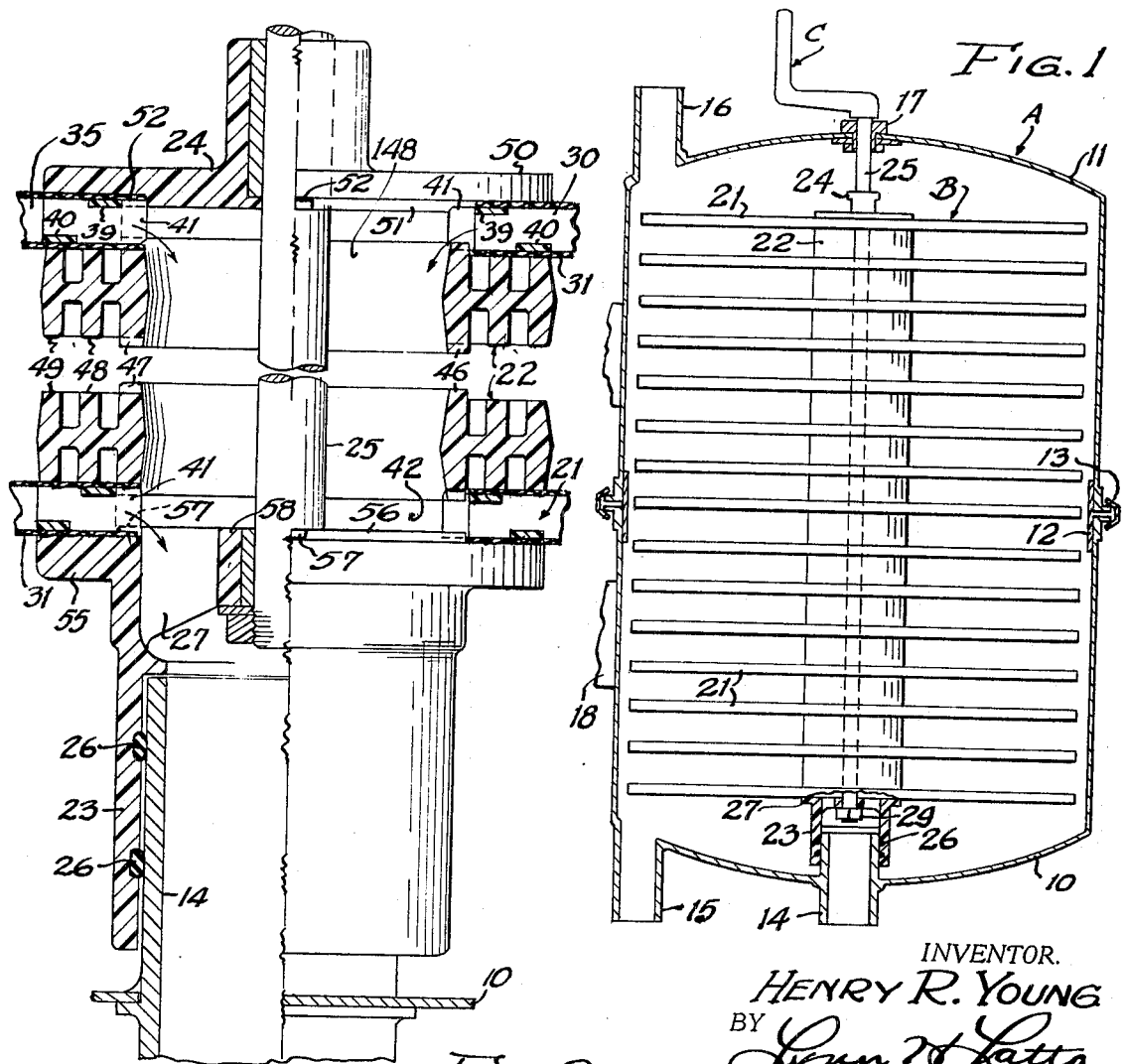
FIG. 1
FIG. 2
INVENTOR.
HENRY R. YOUNG
BY Lynn H. Latta
—ATTORNEY—

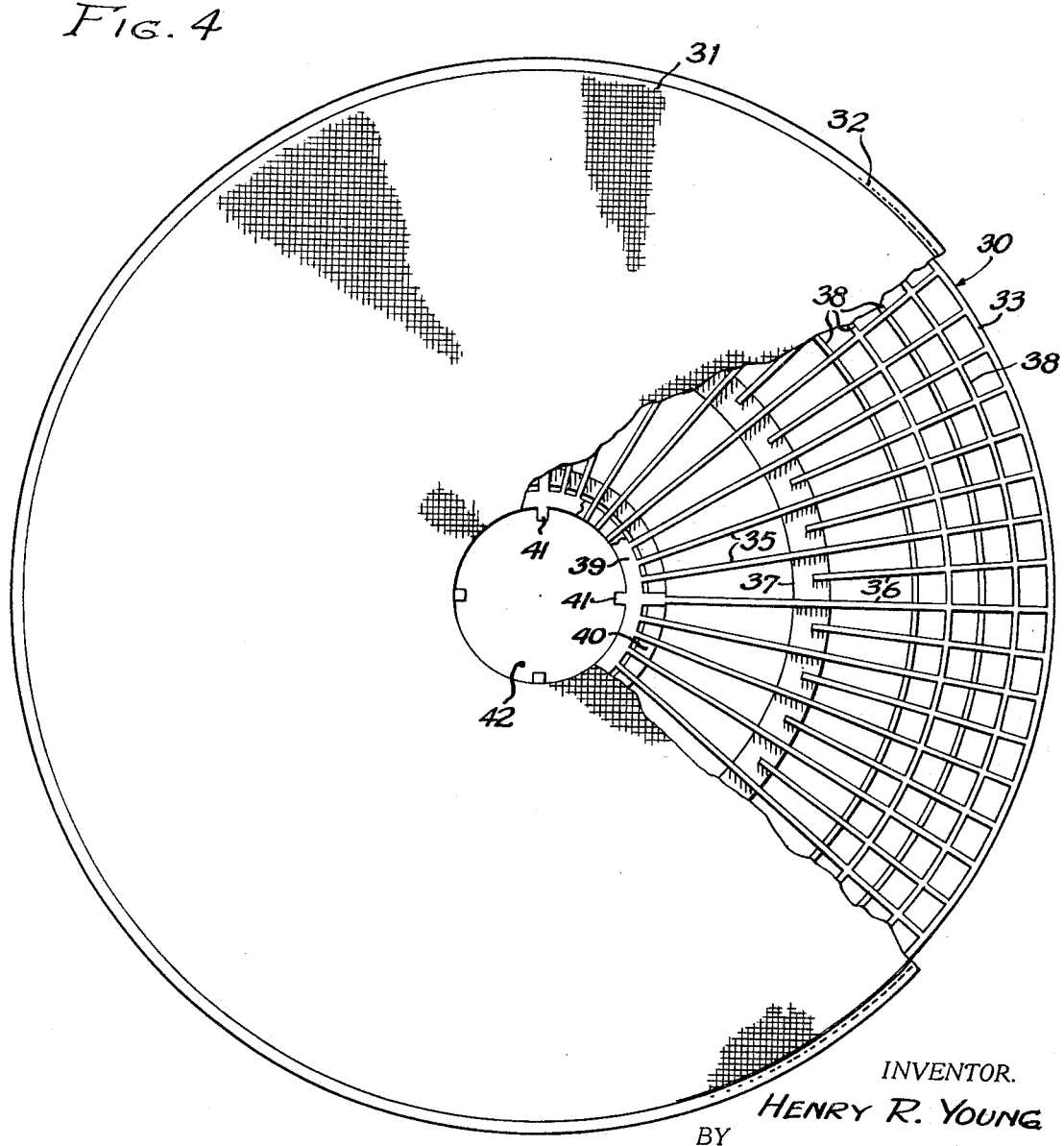
INVENTOR.
HENRY R. YOUNG
BY
Lynn H Latta
-ATTORNEY-

United States Patent Office 3,512,647
Patented May 19, 1970

3,512,647
SWIMMING POOL FILTER COMPRISING ASSEMBLY OF SEPARABLE SPACERS AND HAVING MOLDED PLASTIC GRIDS
Henry R. Young, Arleta, Calif., assignor to Marine Swimming Pool Equipment Company, Van Nuys, Calif., a corporation of California
Filed Aug. 24, 1967, Ser. No. 663,047
Int. Cl. E04h 3/20
U.S. Cl. 210—169
9 Claims

ABSTRACT OF THE DISCLOSURE

Disclosed herein is a filter of the type wherein filter elements consisting of hollow grids covered with filter fabric are supported in a filtering assembly in axially spaced relation, wherein water is forced through the filter elements and into a tubular axial stem and thence through the filter outlet; wherein the filtering assembly is enclosed in a cylindrical casing or tank, and wherein the assembly can be rotated by suitable means outside the casing so as to dislodge layers of deposited sediment from the filter elements into the body of water within the tank.

BACKGROUND OF THE INVENTION

Filters of the general type outlined above are known and have been used heretofore, but the filter elements have been held in compression on a mounting tube or shaft, and frictional clamping has been relied on to secure them in fixed relation to the tube. In the past such filters have been incapable of being cleaned properly, due to the obstruction presented by accumulated sediment in the bottom of the tank, holding the lower filtering elements of the assembly again rotation during a cleaning stage in which rotation is being transmitted to the upper portion of the assembly.

SUMMARY OF THE INVENTION

A principal object of the present invention is to provide a filter of this general type having a filtering assembly embodying a positive drive means for transmitting rotation throughout the axial length of the assembly, eliminating all possibility of slippage, so that the body of sediment can be agitated and loosened during the cleaning stage, making it possible to drain the aqueous mixture of sediment out of the tank.

This object is attained by constructing the filter assembly as a composite of separable interlocking filter elements and spacer collars which cooperate to define an axial flow passage extending along the axis of the assembly and communicating with the interiors of the filter elements so as to filter water through the filter elements and circulate it into said flow passage and thence to an outlet through which the water is moved by the pump of the pool circulating system. This is accomplished in an assembly wherein the filter elements are each composed of a rigid molded plastic grid and a cover of synthetic fiber woven filter fabric stretched under radial tension so as to present smooth flat surfaces from which sediment coatings can be readily dislodged by rotation of the filter assembly.

Another important object is to provide an improved filtering element of this general type, wherein the grid is of one-piece, integral molded construction, including a hub portion embodying interlocking means, avoiding the necessity for using an additional part, or parts cemented to the grid.

A further object is to attain the foregoing features in an assembly wherein the filtering elements are quite rugged and strong and of stable dimensions and shape and yet of reduced fabrication cost; utilizing individual grid and cover members for each filtering element; and composed of assembled parts that if necessary can be readily taken apart for repair, replacement of parts, cleaning or other servicing.

Other objects will become apparent in the following specifications and appended drawings, in which:

FIG. 1 is a side elevational view of a filter embodying the invention, with the casing and associatted parts shown in axial section;

FIG. 2 is a detail sectional view of the outlet portion of the filter assembly;

FIG. 3 is a fragmentary plan view of one of the filtering grid and spacer assemblies;

FIG. 4 is a broken-away plan view of one of the grids; and

FIG. 5 is a peripheral view of the same, partially in radial section.

DESCRIPTION

Referring now to the drawings in detail, I have shown therein, as an example of one form in which the invention may be embodied, a filter comprising, in general, a casing A, housing a filter assembly B adapted to be periodically rotated by means of a crank C in order to dislodge collected sediment. The filter may be mounted with its axis horizontal.

Casing A is sectional, comprising a tank 10 and a lid 11, having respective flanges, between which is interposed an O-ring gasket mounted on a back-up ring 12 telescoped into adjoining ends of tank 10 and lid 11, a V-band clamp 13 coupling the flanges together around back-up ring 12, a filtering outlet 14 in the center of the end of tank 10, a flushing outlet 16 in the lid 11, an inlet 15 in the tank 10, a bearing boss 17 in the center of the lid 11, and suitable mounting legs 18.

Filter assembly B comprises a series of axially-spaced filter elements 21, a plurality of interposed spacers 22, a tubular bell 23 rotatably coupled to an inwardly projecting portion of outlet 14 and attached to the center of the nearest filter element 21, and a top plug 24 attached to the center of the top element 21. Crank C is attached to one end of a shaft 25 which extends rotatably through the bearing bushing 17 and is secured in a hub of top plug 24, so as to transmit rotation through plug 24 to the adjoining filter element 21. Bell 23 receives axially projecting inner end portion of outlet 14 and is coupled thereto by a rotary seal consisting of O-rings 26. Bell 23 has a head in the form of a spider 27 having an apertured hub through which is extended the end of shaft 25, functioning as a tie rod which extends the full axial length of filter assembly B and is secured at its end by a nut 29 threaded thereon and holding the filter elements 21 and spacers 22 in compressive assembly such as to maintain sealed relationship between the hubs of elements 21 and the ends of spacers 22.

Spacers 22 function to axially space the stack of filter elements 21 and also to couple them together so that they can be rotated in unison, the assembly B thus rotating as a unit.

Each filter element 21 comprises a one-piece molded grid 30 and a cover 31 of porous filter fabric, of envelope form, enclosing and stretched under tension over both sides of the grid. The fabric is of synthetic fiber, e.g., polypropylene which is unaffected by moisture and remains in a taut, stretched condition when immersed in water. The cover 31 is fabricated of two sheets of the fabric which are drawn together around the periphery of grid 30 and bound by a sewed seam 32 consisting of a line of stitching immediately adjacent the rim 33 of the grid. The seam 32 secures the adjacent peripheral portions of the cover sheets in tightly-drawn engagement with rim 33 and places the entire area of each cover sheet under radial tension uniformly around its periphery, thus maintaining the cover in a flat, smooth, unwrinkled condition. Thus when the filter unit B is rotated within the casing A, the wiping action of the layers of water between the filter elements 21 will quickly dislodge the layers of sediment collected on the elements 21, so that the collected material may mix with the body of water and then be drawn off through flushing outlet 16 when the latter is opened by a suitable valve (not shown).

Grid 30 is of one-piece molded plastic material such as high-heat, high-impact styrene or equivalent, highly rigid and tough. It comprises the rim 33; a large number of spokes 35 and 36, the former extending from rim 33 to the grid hub and the latter extending from rim 33 to an intermediate web ring 37 lying in the medial plane of the grid; a plurality of reinforcing rings 38 half the depth of rim 33 in axial dimension and disposed alternately at opposite faces of the grid; and a pair of hub rings 39 and 40 on opposite faces of the grid, and of different diameters to facilitate molding as an integral portion of the grid. A plurality of interlock dogs 41, extending axially the full depth of the grid from face to face, project radially into a hub opening 42 which is defined inwardly of hub rings 40 and 39. The spokes 35, 36 are relatively thin circumferentially but have an axial width extending full depth from face to face of the grid. Between the spokes and the cover 31 are defined a large number of radial flow passages, through which the water that is filtered through cover 31, may flow radially inwardly to hub opening 42, as indicated by arrows, passing the staggered, half-depth rings 38 in a zig-zag path, flowing around both sides of web ring 37 (which is relatively thin axially and wide radially) and finally passing into hub opening 42 through openings defined between hub rings 39 and 40 and the spaced inner ends of spokes 35.

The tendency of reinforcing rings 38 to obstruct this radial flow in the outer area of the grid 30 is offset by the greater circumferential width of the radial flow passages in that area, while in the intermediate area of the grid the rings 38 are discontinued, leaving the spaces between the spokes unobstructed, and in the central area of the grid the spokes 36 are discontinued, thus providing additional space in the flow passages. As a result the flow resistance remains substantially uniform from periphery to center, and at a relatively low level, yet the grid is very rugged and sturdy and will maintain its flat shape and position in the assembly of filter discs, indefinitely.

Spacers 22 are in the form of rings, each including a central collar portion 46 having in respective end margins a plurality of interlock notches 47 to receive driving dogs 41 of adjacent filter elements 21; and having at both ends, intermediate and outer circular lands 48 and 49 adapted to seat (through cover 31) against the smaller and the larger hub rings 39 and 40 respectively of the adjacent filter discs. The ends of collar portion 46 project axially beyond the lands 48 and 49 so as to enter the central openings defined in filter elements 21 by the smaller hub rings 39 and by the inner ends of spokes 35 which are disposed in annular array, ending flush with the inner margin of ring 39. The reception of the ends of collar portion 46 in these central openings of elements 21 provides coaxial coupling of the filter elements to the spacers 22. The collar portions 46 of the spacers then define an axial passage 148, communicating with the interiors of elements 21, extending from end to end of the filter assembly B. The engagement of dogs 41 in spacer notches 47 provides a positive drive connection between the succession of elements 21.

Cap plug 24 includes a radial flange 50 adapted to seat against the hub portion of the adjoining element 21, a shallow pilot 51 adapted to enter the hub opening of the adjoining element 21, and peripheral notches 52 in pilot 51, adapted to receive the dogs 41 of the adjoining element 21 so as to provide a positive drive connection between plug 24 and the filter assembly B while plugging the hub opening of the adjoining element 21. Correspondingly, the bell 23 embodies a radial flange 55 as the periphery of spider 27, adapted to seal the hub of the adjoining element 21, an upwardly projecting pilot 56 adapted to enter the hub opening of the adjoining element 21, and notches 57 in pilot 56, to receive the dogs 41 of the adjoining element 21, The bell 23 then functions as a bearing bushing, turning with the assembly B, and receiving the inner end of outlet 14 to provide a rotary fluid coupling which is sealed by quad-rings 26. The nut on the end of shaft 25 is tightened against a hub 58 in the center of spider 27, to clamp the filtering elements 21 and spacers 22 in tight assembly. Passage 48 is continued through spider 27 into outlet 14.

OPERATION

In the operation of the filter, the pool circulation pump is connected to the filter so as to move the water into casing A, through the covers 31 of filter elements 21 into the interiors of the elements 21, and thence into the passage 48 through the hubs of the filter elements 21, as indicated by arrows in FIGS. 2 and 5. Water from the pool circulates into casing A through inlet 15. When it is desired to clean the filter, the crank C is utilized to rotate the assembly B without opening casing A, the dislodged sediment is moved outwardly by the centrifugal action of the rotating filter elements, into the water with which it forms a mixture which may be drained off through flushing outlet 16 by opening the latter. For occasional thorough cleaning, the band clamp 13 may be loosened, the crank disconnected, the lid 11 removed, the assembly B taken out of the casing, and, where repair is necessary, the elements 21 and spacers 22 may be separated.

I claim:
1. In a swimming pool filter apparatus comprising a casing having an inlet at one end and an axial outlet at its other end; a filter assembly comprising:
    a series of filter elements each comprising a spider-like grid and a cover comprising sheets of porous filter fabric enclosing the same;
    and a series of separate annular spacers interposed between successive filter elements in a columnar array along the axis of said filter assembly;
    said filter elements having respective hub openings and said spacers having respective central hub collars projecting into said openings and collectively defining therewith a flow passage extending axially through said assembly;
    said spacers having respective annular body portions radially outward of said collars, said body portions including annular lands facing in axially opposite directions;
    said grids each including a pair of axially spaced integral flat hub rings in axially opposed relation to the lands of adjacent spacers on respective sides of the respective grid and functioning to seat the respective filter element to the radial flow internally of said filter elements inwardly into said hub openings;
    rotary driving means at said one end of the casing, having a shaft extending rotatably into the casing along said axis;
    said spacers and grids including interlocking parts coupling said spacers to said filter elements and one end of said assembly to said shaft, providing positive rotary drive connections between said driving means and the successive filter elements such that said driving means may be utilized to rotate said filter assembly as a unit within said casing, for dislodging sedimentary coatings from said filter elements into a body of water within said casing; and
    means rotatably coupling the other end of said assembly to said casing outlet whereby a pool circulation pump will create a filtering flow of pool water into said casing, thence into said filter elements, and from the interiors of said filter elements into said axial passage and thence to said outlet.

2. A filter apparatus as defined in claim 1, wherein said fabric covers have central openings defined within inner marginal portions which are clamped between said lands and said grid hub rings.

3. A filter apparatus as defined in claim 2, wherein said hub rings are of different diameters and radially offset on opposite sides of the respective filter elements and wherein said spacer lands are correspondingly of different diameters.

4. A filter apparatus as defined in claim 1, wherein said positive drive connections comprise integral drive lugs on said grids, projecting radially inwardly into said hub openings, and notches in the axial extremities of said spacer hub collars, said lugs projecting into said notches in driving engagement with said collars.

5. A filter apparatus as defined in claim 1, including tie means compressively securing said filter elements and said spacers and interlocking parts in said assembly, with the ends of said spacers sealed to said central openings of said filter elements and with said positive drive connections maintained by said compressive securing of said assembly.

6. A filter apparatus as defined in claim 1, wherein said filter element grid is of wheel-like spider form and of integral molded plastic structure and material including said interlocking parts:
said grid embodying a plurality of spokes disposed in radial planes of said axis and defining radial flow passages between them, and a plurality of radially spaced circumferential rings bridging between and integrally joining said spokes, said rings having axial depth equal to only a fraction of the axial depth of said grid so as to avoid obstructing said radial flow passages;
said spokes having inner ends in circumferential array defining the periphery of said hub opening, said inner ends being separated circumferentially by open spaces communicating the inner ends of said radial flow passages with said hub opening.

7. A filter apparatus as defined in claim 1, wherein said filter element grid is of integral, substantially rigid, molded plastic structure and of wheel-like spider form including a peripheral rim; and wherein:
said cover is stretched smoothly over said grid and substantially flat, under radial tension, said cover comprising respective sheets stretched around said rim and peripherally secured together adjacent said rim so as to anchor the periphery of the cover upon said rim and to thereby maintain said radial tension.

8. A filter apparatus as defined in claim 1, wherein said filter element grid is of integral, substantially rigid molded plastic structure and of wheel-like spider form including a peripheral rim;
said grid having central rings defining a hub opening; and
said cover sheets having central openings defined by inner margins thereof which substantially register with said hub opening of the grid and are clamped between opposed ends of adjacent spacers in said assembly.

9. A filter apparatus as defined in claim 1, wherein said filter element grid is of integral, substantially rigid, molded plastic structure and of wheel-like spider form including a peripheral rim;
said grid embodying a central ring and radial spokes having inner ends in circumferential array defining with said central ring a hub opening in said grid, said inner ends being separated circumferentially by open spaces communicating the inner ends of said radial flow passages with said grid hub opening;
said cover sheets having central openings defined by inner margins thereof which substantially register with said hub opening of the grid and are clamped between the lands of adjacent spacers in said assembly.

References Cited

UNITED STATES PATENTS

| 1,446,448 | 2/1923 | Brown | 210—331 X |
| 3,019,905 | 2/1962 | Baker et al. | 210—331 X |
| 3,187,898 | 6/1965 | Baker | 210—331 |
| 3,187,899 | 6/1965 | Prizler | 210—331 |
| 3,259,248 | 7/1966 | Wiegland | 210—347 X |
| 3,297,163 | 1/1967 | Landon | 210—347 X |
| 3,315,812 | 4/1967 | Lewis et al. | 210—487 |

REUBEN FRIEDMAN, Primary Examiner

T. A. GRANGER, Assistant Examiner

U.S. Cl. X.R.

210—331